United States Patent Office 3,150,853
Patented Sept. 29, 1964

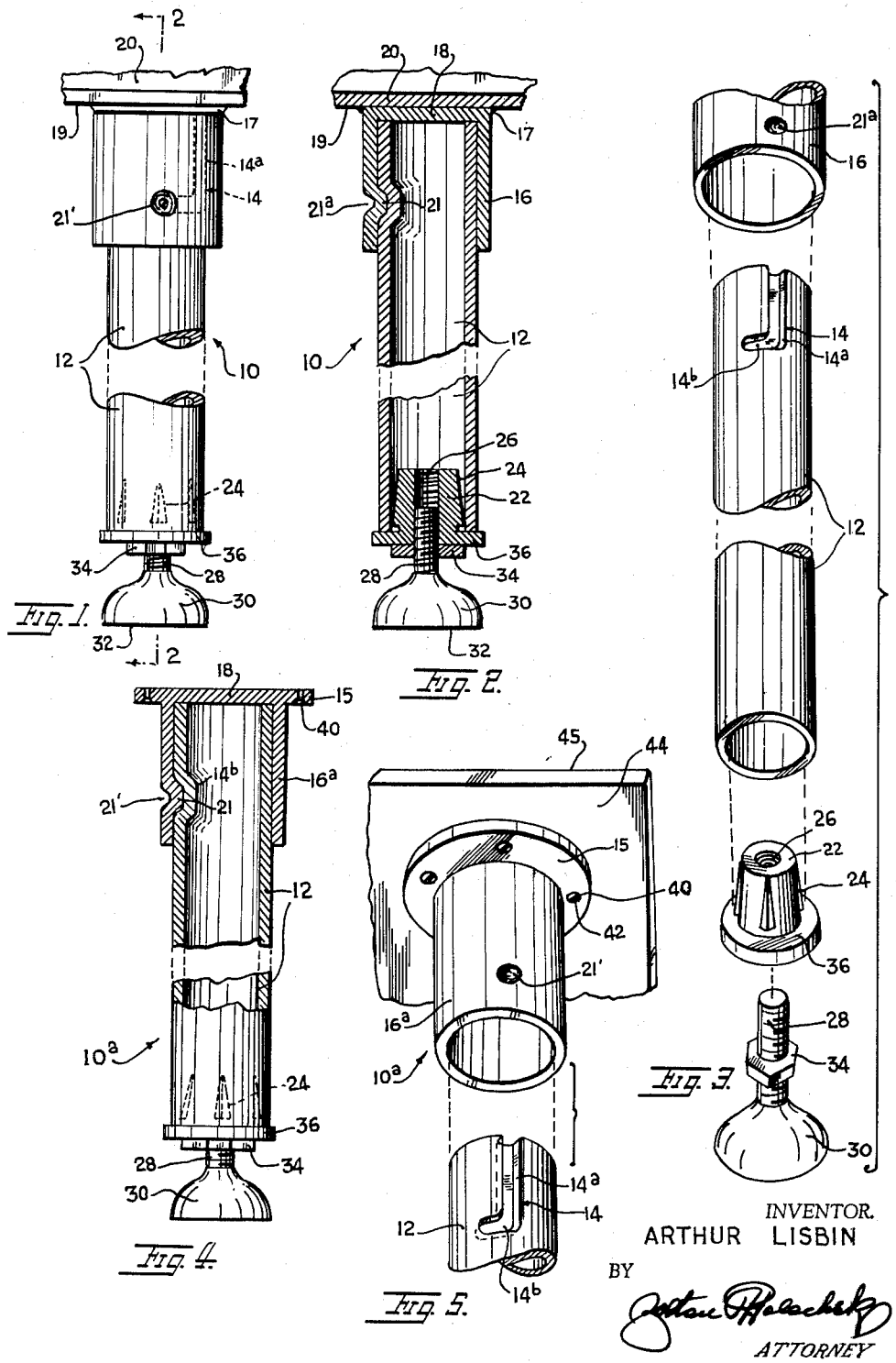

3,150,853
ADJUSTABLE LEG CONSTRUCTION
Arthur Lisbin, Paterson, N.J., assignor to New Jersey Bank and Trust Company, Paterson, N.J., a New Jersey banking corporation
Filed May 14, 1962, Ser. No. 194,525
1 Claim. (Cl. 248—188.4)

This invention concerns an improved leg construction for sinks, cabinets, tables and the like.

According to the invention there is provided a socket which may be permanently attached to the underside of a sink or other fixture. The socket has an internal projection which engages in an embossed bayonet groove formed in the upper end of a hollow cylindrical leg. In the lower end of the leg is a fitting or bushing having wedge-shaped projections extending radially from a cylindrical body. These projections insure a secure frictional engagement of the fitting in the leg. The fitting has an axially threaded bore and an annular radial flange. The flange abuts the underside of the leg and the threaded bore adjustably receives a threaded stud of a mounting foot. A locking nut may be mounted on the stud for securing the foot nonrotatably to the fitting. The structure is arranged for quick attachment and detachment of a leg to the underside of a fixture and for quick adjustment of the axial length of the structure. The invention makes it possible to install sinks, cabinets and other fixtures in a minimum of time and with a minimum of labor.

It is therefore one object of the invention to provide a leg construction for sinks, cabinets and other fixtures, in which a leg is attachable by a quick-fit joint at one end to a socket under the fixture, and in which a mounting foot is adjustably attached to the other end of the leg.

A further object is to provide a leg construction as described, wherein a fitting or bushing is frictionally engaged in the other end of the leg and the foot has a threaded stud secured in the fitting.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is a side elevational view of a leg structure embodying the invention, part of the leg being broken away.

FIG. 2 is a sectional view taken on line 2—2 of FIG. 1.

FIG. 3 is an exploded perspective view of parts of the leg structure, parts of the leg and socket being broken away.

FIG. 4 is a view, partially in vertical section and partially in side elevation, of another leg structure especially adapted for use in tables and benches.

FIG. 5 is an exploded perspective view of parts of the leg structure of FIG. 4.

Referring to FIGS. 1–3, there is shown a leg structure 10, including a cylindrical tube or pipe 12 formed with an L-shaped embossed groove 14 at its upper end. This embossed groove has a longitudinally extending section 14ª extending downwardly from the top free edge of the tube and a circumferentially extending section 14ᵇ. The upper end of the tube 12 fits into a cylindrical, hollow socket 16. The socket has an internal projection 21 engaged in embossed groove 14. The socket may have a closed upper end 18. The upper end of the socket may be permanently secured by welding 17 or otherwise to the underside 19 of a sink, cabinet or other fixture 20 partially shown in FIGS. 1 and 2. If desired, the closed upper end 18 of the socket may be omitted, and the upper end of the tube 12 will then abut the underside of the fixture 20 instead of the underside of end 18.

In the lower open end of tube 12 is a fitting or bushing 22 frictionally engaged by longitudinally extending, circumferentially spaced wedge-shaped projections 24. The wedge-shaped projections are, as best shown in FIG. 3, downwardly increasingly tapered, and of triangular cross section. At their lower ends they terminate in sharp radially extending points which engage in the interior of the tubular member. These projections grip the inside of the tube 12 so that the fitting resists rotational and axial displacement with respect to the tube. The fitting 22 has an axial threaded bore 26. Screwed into this bore is a threaded stud 28 extending axially upward of a massive partially cylindrical foot 30 having a flat circular bottom end 32. A locking nut 34 may be threaded on the stud 28 and tightened against the underside of flange 36 formed at the bottom of the fitting. Flange 36 is an annular element which extends radially outward of the cylindrical body of the fitting and its upper side abuts the bottom end of tube 12 in the assembled leg structure as shown in FIGS. 1 and 2.

In assembly of the structure, socket 16 may be permanently attached to the fixture 20 at the time of manufacture of the fixture or subsequently thereto. The leg structure will be completed by inserting the upper end of tube 12 into the socket. The projection 21 will be interfitted with embossed groove section 14ª and the leg will be moved axially until projection 21 is aligned with embossed groove section 14ᵇ, whereupon the tube 12 will be turned to engage projection 21 in groove section 14ᵇ as best shown in FIG. 2. The socket 16 can be made of stamped or drawn sheet metal and projection 21 can be formed by pressing inwardly on the wall of the socket to leave an external depression 21'. When the tube is engaged with the socket as described, the groove 14 is wholly concealed in the socket. The fitting 22 may be inserted into the lower end of tube 12 prior to or after mounting of the tube in the socket. This is done by forcing the fitting axially into the leg until flange 36 abuts the free lower end of the leg.

The diameter of the cylindrical body of the fitting should be slightly smaller than the interior of the tube. The wedge-shaped projections 24 will serve as spacers and friction gripping elements. The stud 28 carrying nut 34 can then be screwed into bore 26 any desired distance to determine the final axial length of the leg structure. By tightening the nut 34 against the flange 36, the foot 30 is secured nonrotatably with respect to the fitting and tube. If desired, the nut 34 can be omitted, to dispense with the locking function of the nut.

FIGS. 4 and 5 illustrate another form of the invention in which leg structure 10ª is substantially like that of leg structure 10. Corresponding parts are identically numbered. Socket 16ª has a radially extending flange 15 at end 18. This flange is formed with holes 40 countersunk at the underside of the flange. These holes can receive screws 42 by means of which the socket can be secured to the underside of a board 44 for making a table or work bench 45. A plurality of leg structures 10ª may be attached to respective corners of a rectangular board 44 for making the table or bench. Other parts of leg structure 10ª are identical with those shown in FIGS. 1–3 and are assembled as described above.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new and desire to secure by United States Letters Patent is:

A leg structure for a sink, cabinet, table and the like, comprising a tubular member, a generally cylindrical bushing fitted in the bottom end of said tubular member, said bushing having a threaded bore and circumferentially spaced longitudinally extending external of downwardly increasingly tapered projections of triangular cross section terminating in sharp radially extending triangular points wedgingly engaged with the interior of said tubular member, and a mounting foot having a threaded stud adjustably engaged in said bore, said bushing having a radially extending flange for abutting the other end of the tubular member, said stud having a nut thereon for locking the foot to the bushing.

References Cited in the file of this patent
UNITED STATES PATENTS

| | | |
|---|---|---|
| 363,122 | Dimick | May 17, 1887 |
| 2,272,848 | Miller | Feb. 10, 1942 |
| 2,767,513 | Bluestone | Oct. 23, 1956 |

FOREIGN PATENTS

| | | |
|---|---|---|
| 581,685 | Germany | Aug. 1, 1933 |